United States Patent
Uno et al.

(10) Patent No.: US 11,529,942 B2
(45) Date of Patent: Dec. 20, 2022

(54) GENERATOR CONTROL SYSTEM FOR VEHICLE

(71) Applicant: Mitsubishi Electric Corporation, Tokyo (JP)

(72) Inventors: Norifumi Uno, Tokyo (JP); Hideyuki Imanaka, Tokyo (JP); Junya Sasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 288 days.

(21) Appl. No.: 15/931,784

(22) Filed: May 14, 2020

(65) Prior Publication Data

US 2020/0398815 A1 Dec. 24, 2020

(30) Foreign Application Priority Data

Jun. 19, 2019 (JP) .............................. JP2019-113319

(51) Int. Cl.
*B60W 20/10* (2016.01)
*F02D 41/24* (2006.01)
(Continued)

(52) U.S. Cl.
CPC ............ *B60W 20/10* (2013.01); *B60W 10/06* (2013.01); *B60W 10/08* (2013.01);
(Continued)

(58) Field of Classification Search
CPC ...... B60W 20/10; B60W 10/06; B60W 10/08; B60W 30/188; F02B 63/042;
(Continued)

(56) References Cited

U.S. PATENT DOCUMENTS 8,183,819 B2 * 5/2012 Sugano ................. B60L 53/305
307/9.1
8,478,470 B1 * 7/2013 Meads ................. B60W 10/08
701/87
(Continued)

FOREIGN PATENT DOCUMENTS

CN 101267694 A * 9/2008
CN 101267695 A * 9/2008
(Continued)

OTHER PUBLICATIONS

French Search Report dated Apr. 1, 2022 in Patent App. No. FR2006149.
(Continued)

*Primary Examiner* — Joseph J Dallo
(74) *Attorney, Agent, or Firm* — Sughrue Mion, PLLC; Richard C. Turner (57) ABSTRACT

The generator control device for vehicle is provided with a boost permission determination circuit capable of controlling the power generation rate, if there is communication between the engine control device and the generator control device for vehicle, the boost permission determination circuit performs the field current control so that the specified power generation rate is achieved by the communication, if there is no communication between the engine control device and the generator control device for vehicle, based on the rotation speed and temperature of the generator for vehicle, the boost permission determination circuit performs the field current control.

7 Claims, 6 Drawing Sheets

(51) Int. Cl.
  *F02B 63/04* (2006.01)
  *B60W 10/06* (2006.01)
  *B60W 30/188* (2012.01)
  *B60W 10/08* (2006.01)

(52) U.S. Cl.
  CPC ......... *B60W 30/188* (2013.01); *F02B 63/042* (2013.01); *F02D 41/2406* (2013.01); *H02J 2310/48* (2020.01); *H02J 2310/52* (2020.01)

(58) Field of Classification Search
  CPC .............. F02D 41/2406; H02J 2310/48; H02J 2310/52; H02J 7/2434; H02J 7/163
  See application file for complete search history.

(56) References Cited

U.S. PATENT DOCUMENTS

| | | | |
|---|---|---|---|
| 2010/0072946 A1* | 3/2010 | Sugano | B60L 53/305 320/108 |
| 2011/0109278 A1 | 5/2011 | Kikuchi et al. | |
| 2014/0210426 A1 | 7/2014 | Terada et al. | |
| 2014/0368171 A1 | 12/2014 | Maehara | |
| 2017/0346431 A1 | 11/2017 | Auer et al. | |

FOREIGN PATENT DOCUMENTS

| | | | | |
|---|---|---|---|---|
| JP | 2003-074388 A | 3/2003 | | |
| JP | 2008-184917 A | 8/2008 | | |
| JP | 2011-101547 A | 5/2011 | | |
| JP | 2011-229219 A | 11/2011 | | |
| JP | 2015-002646 A | 1/2015 | | |
| JP | 2018-176802 A | 11/2018 | | |
| WO | WO-0217467 A1 * | 2/2002 | ........ | H02M 3/33507 |

OTHER PUBLICATIONS

Communication dated Aug. 18, 2020 from Japanese Patent Office in JP Application No. 2019-113319.

* cited by examiner

GENERATOR CONTROL SYSTEM FOR VEHICLE

TECHNICAL FIELD

The present application relates to a generator control system for vehicle that controls a generated voltage of a generator that is rotationally driven by an engine.

BACKGROUND ART

By suppressing the power generation rate of the generator for vehicle according to the engine system for vehicle, a single generator for vehicle can be applied to a plurality of engine systems for vehicle having different power generation rates.

A conventional generator control system for vehicle is configured to provide a generator control device for vehicle and a generator part.

The generator control device for vehicle receives a control signal transmitted from the engine control device by a communication circuit, receives a rotation pulse from the stator coil, sends a driving signal to the generator part by processing a field current control based on the rotation speed information and turns the switching element to on/off.

In the generator part, the return diode is connected in parallel to the field coil, and the current flowing in the field coil is returned when the switching element is off. The generator part generates power based on the gate driving signal from the field current control circuit and charges a battery outside the generator for vehicle.

The field current is controlled from the engine control device so that the power generation rate come from 0 to 100% according to the state of the vehicle system when there is communication from the engine control device, power generation in the generator part is performed by rotational driving by the engine.

Further, the field current control is performed on the generator control device for vehicle using a default value determined in advance at the design stage when there is no communication from the engine control device, and power generation in the generator part is performed.

PRIOR ART DOCUMENT

Patent Literature

[Patent Literature 1] JP 4509986 B2

DISCLOSURE OF INVENTION

Technical Problem

In the generator control system for vehicle disclosed in Patent Document 1, the default value used when there is no communication from the engine control device is a default value considering only the rotational speed, when a single generator for vehicle is applied to, for example, an engine system for vehicle having a low power generation rate, it is assumed that the torque of the generator for vehicle exceeds the torque allowed by the engine and reaches an engine stall. On the other hand, if the default value used in consideration of the worst case of the rotational speed is used as the default value when there is no communication from the engine control device, the power generation rate in the best case will be lower than the rated power, and it is assumed that the power required by the vehicle cannot be supplied.

The present application discloses a technique made in view of the above situation, it is an object of the present invention that even when a generator for vehicle with a large current capability is applied to an engine system that may have a small power generation rate, the field current is controlled so that the maximum torque does not become larger than that of a generator for vehicle having a small power generation rating, and the rated power is maintained.

Solution to Problem

In the generator control system for vehicle disclosed in the present application, the generator control system for vehicle in which the generator control device for vehicle performs different field current control when there is communication between the engine control device and the generator control device for vehicle and when there is no communication, a boost permission determination circuit capable of controlling the power generation rate is provided in the control device for the generator for vehicle, a field current control is performed by the boost permission determination circuit so as to achieve a specified power generation rate by the communication when there is communication between the engine control device and the generator control device for vehicle, a field current control is performed by the boost permission determination circuit based on the rotation speed and temperature of the generator for vehicle when there is no communication between the engine control device and the generator control device for vehicle, the field current control is performed by the boost permission determination circuit so that the torque generated by the generator for vehicle does not become larger than the torque allowed by the engine when the generator for vehicle applied to an engine system whose power generation rate may be smaller than the current capacity of the generator for vehicle.

Advantageous Effects of Invention

In the generator control system for vehicle disclosed in the present application, the generator control system for vehicle in which the generator control device for vehicle performs different field current control when there is communication between the engine control device and the generator control device for vehicle and when there is no communication, a boost permission determination circuit capable of controlling the power generation rate is provided in the control device for the generator for vehicle, when there is communication between the engine control device and the generator control device for vehicle, the field current control is performed by the boost permission determination circuit so as to achieve a specified power generation rate by the communication, when there is no communication between the engine control device and the generator control device for vehicle, the field current control is performed by the boost permission determination circuit based on the rotation speed and temperature of the generator for vehicle, when the generator for vehicle applied to an engine system whose power generation rate may be smaller than the current capacity of the generator for vehicle, the field current control is performed by the boost permission determination circuit so that the torque generated by the generator for vehicle does not become larger than the torque allowed by the engine, even if a generator for vehicle with a large current capability is applied to an engine system that can have a small power generation rate, the field current can be controlled so that the torque generated by the generator for vehicle does not become larger than the torque allowed by the engine, and the rated power can be maintained.

DESCRIPTION OF EMBODIMENTS

A generator control system for vehicle according to a first embodiment of the present invention will be described below with reference to FIGS. 1 to 6. Note that this application is not limited to the following description, and modifications can be made as appropriate without deviating from the scope of the present application. Further, illustration and description of configurations not related to the features of the present application are omitted.

First Embodiment

Figure 1:
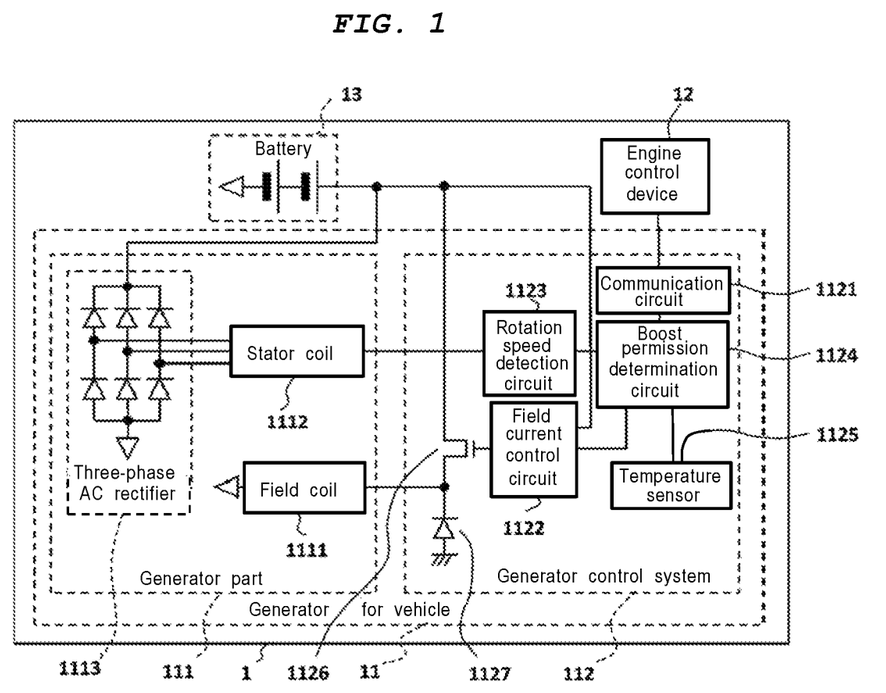
FIG. 1 is a diagram showing a first embodiment of the present application, and is a block diagram showing an example of a system configuration of a generator control system for vehicle.

In FIG. 1, a generator control system for vehicle 1 is configured with a generator for vehicle 11 having a generator control device for vehicle 112 and a generator 111, and an engine control device 12 and a battery 13.

A boost permission determination circuit 1124 of the generator control device for vehicle 112 receives a control signal transmitted from the engine control through a communication circuit 1121, receives a rotation pulse from a stator coil 1112, further, receives the temperature information from a temperature sensor 1125, sends a gate driving signal from a field current control circuit 1122 to the generator part by processing a field current control based on the rotation speed information and the temperature information.

In a field coil 1111 of the generator part 111, the return diode is connected in parallel to the field coil, and the current flowing in the field coil 1111 is returned when a switching element 1126 is off. Further, the switching element 1126, for example, an IGBT (Insulated Gate Bi-polar Transistor) which is a controllable power semiconductor element is used.

The generation part 111 includes the stator coil 1112 and a three-phase AC rectifier 1113, power is generated based on the gate driving signal from the field current control circuit 1122, the battery 13 outside the generator for vehicle is charged from the stator coil 1112 via the three-phase AC rectifier 1113.

When there is communication from the engine control device 12 to the generator control device for vehicle 112, depending on the state of the vehicle system from the engine, engine control device 12, etc., the field current is controlled so that the power generation rate is from 0 to 100%, and power generation by the generator part 111 is performed by rotational driving by the engine.

Figure 4:
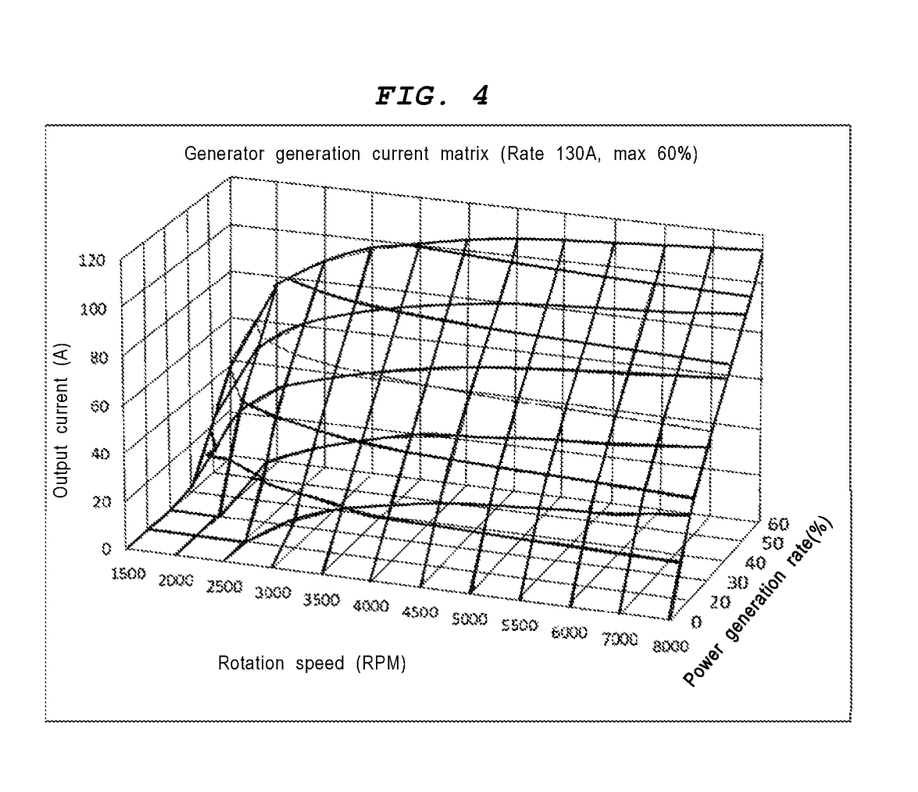
FIG. 4 is a diagram showing the first embodiment of the present application, a graph showing an example of a three-dimensional data matrix related to a generator generation current used when there is no communication between the engine control device and the generator control device for vehicle in the generator control system for vehicle of FIG. 1, and the case of measured value data measured at an ambient temperature (23±5) ° C. is illustrated.
Figure 5:
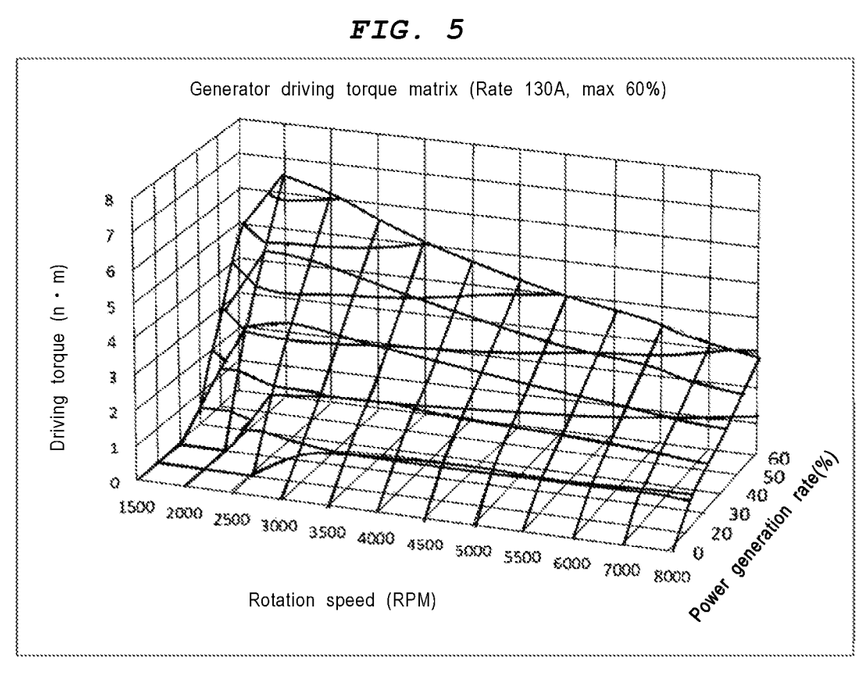
FIG. 5 is a diagram showing the first embodiment of the present application, a graph showing an example of a three-dimensional data matrix related to generator drive torque used when there is no communication between the engine control device and the generator control device for vehicle in the generator control system for vehicle of FIG. 1, and the case of measured value data measured at an ambient temperature (23±5) ° C. is illustrated.

Further, when there is no communication from the engine control device 12 to the generator control device for vehicle 112, in the boost permission determination circuit 1124 of the control device 112 for generator for vehicle, according to the default value calculated and selected based on the data of the temperature information acquired from the temperature sensor 1125, the generator generation current corresponding to the temperature of the temperature information and the three-dimensional correlation matrix related to generator driving torque (see FIGS. 4 and 5 illustrating the three-dimensional correlation matrix), the field current control is performed, and power generation by the generator part 111 is performed. Further, the default value used in the present application refers to a value determined at the design stage.

The boost function in the boost permission determination circuit 1124 is a function wherein the output current does not affect the engine system under normal conditions, for example in the case of a vehicle generator with a maximum power generation rating of 130 A, the output current is set up to 80 A (power generation rate 60%), the maximum power generation rating is set to 130 A (100% power generation rate) and power is generated in an area that does not exceed the maximum torque value, only under limited conditions (for example, at low temperature or high temperature and within a specified time). In other words, in the first embodiment, this boost function means a release (100% power generation rate) from the power generation rate limitation (for example, 60% power generation rate).

The generator control device for vehicle 112 inputs the control signal received from the engine control device 12 via the communication circuit to the boost permission determination circuit 1124. In addition, a rotation pulse is received from the stator coil 1112 via a rotation speed detection circuit 1123, boost control processing is performed, and the gate driving signal is transmitted from the field current control circuit 1122 to the generator part 111.

When there is communication from the engine control device 12 to the generator control device for vehicle 112, the communication circuit 1121 of the control device 112 for the generator for vehicle receives instructions from the engine control device 12 such as if the boost function can be used or not, and the field current ON/OFF.

The communication circuit 1121 measures whether a control signal is transmitted from the engine control device 12, when the control signal from the engine control device 12 to the communication circuit 1121 does not change, it is determined as a timeout, information on the presence or absence of the control signal is generated, and transmission to boost permission determination circuit 1124 is performed. At this time, it is determined if the boost function is used or not in the control device 112 for the generator for vehicle, and the field current ON/OFF control is performed.

When there is no communication from the engine control device 12 to the communication circuit 1121 of the generator control device for vehicle 112, the appropriate default value from temperature data for the temperature information acquired from the temperature sensor 1125 and the three-dimensional data matrix related to the generator power generation current created corresponding to the temperature and stored in the boost permission determination circuit 1124 (see FIG. 4 which is an example of the data displayed in the figure) is calculated and selected by the boost permission determination circuit 1124, and the field current control circuit 1122 controls the field current ON/OFF based on the appropriate default value set for temperature in the boost permission determination circuit 1124.

The power generation rate restriction instruction from the engine control device is a limit value, and is controlled so that the power generation rate does not increase further. For example, when the limit value is 60%, the optimum power generation rate is adjusted within a range of 0% to 60% so that the battery voltage attains the target value. Therefore, when the power generation rate is limited to 60%, control is performed so that power generation cannot be performed to 60% or more.

In FIG. 4, the power generation rate is 60% at 3000 rpm and for an output current of 100 A, even if more load current (for example, 120 A) is required, if the rotation speed is constant (3000 rpm), the power generation rate limit (60%) is applied, the output current can only be output up to 100 A, and the shortage is taken out of the battery and the voltage is reduced.

As it is clear from the contents shown in FIG. 4, the output current increases as the rotational speed and the power generation rate increase.

Further, as it is apparent from the contents shown in FIG. 5, the driving torque increases as the rotational speed decreases and the power generation rate increases. Also, the torque increases at a rotation speed around 2000 rpm.

Since the power generation rate and the torque are proportional, the maximum power generation rate, in other words, the torque, is suppressed by a power generation rate limiting command that is the communication information from the engine control device to the boost permission determination circuit.

FIGS. 4 and 5 show an example of a case where measurement is performed at an ambient temperature of 23±5° C. in accordance with the SAE (Society of Automatic Engineers) standard, which is an industry standard issued by the American Society of Automotive Engineers SAE. Therefore, due to the ambient temperature other than 23±5° C. (for example, 5° C., 40° C.), although the tendency illustrated in FIGS. 4 and 5 changes, the graphs corresponding to various environmental temperatures are not illustrated. Further, in the present application, a default value corresponding to an environmental temperature different from the default value described above is prepared, and a more appropriate control is performed by determining the default value corresponding to the measured environmental temperature from the prepared default valve.

Figure 6:
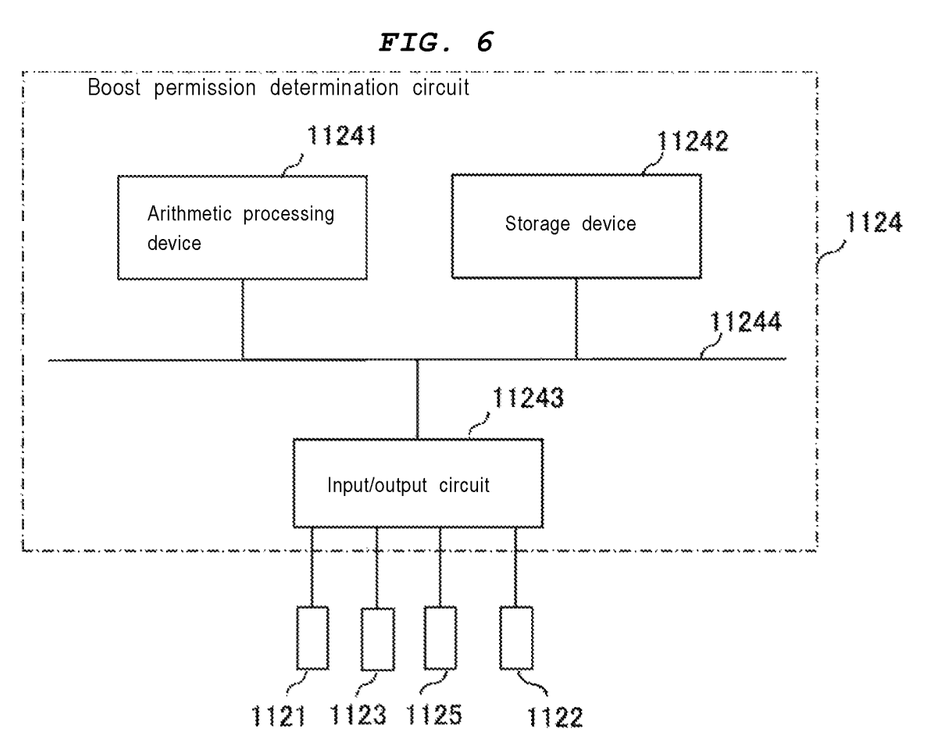
FIG. 6 is a diagram illustrating the first embodiment of the present application, and is a diagram illustrating an example of an internal configuration of a boost permission determination circuit in FIG. 2.

For example, when the power generation rate limit value by the boost function can be selected as 70%, 80%, 90%, 100%, in the boost permission determination circuit, the information in the matrix of FIGS. 4 and 5 is used as a pattern, for example, it is stored in a storage device 11242 in FIG. 6, and for example, in response to the rotational speed of the generator for vehicle detected by the rotational speed detection circuit 1123, the power generation rate by the boost function can be set to 70%, 80%, 90%, 100%, etc.

Further, the diode constituting the three-phase AC rectifier 1113 may be realized by using a low-loss diode (for example, a Zener diode) other than a general diode.

In the case of FIG. 1 described above, the case where the field current control means, the communication means, the rotation speed detection means, the temperature detection means, and the boost permission determination means are configured by the circuits 1121 to 1125 has been illustrated and described as an example. Here, the boost permission determination circuit 1124 illustrated in FIG. 1 includes, for example, an arithmetic processing unit 11241 such as a CPU (Central Processing Unit) connected to a bus 11244 as illustrated in FIG. 6 and the storage device 11242 including an RAM (Random Access Memory) and a ROM (Read Only Memory), and an input/output circuit 11243 can also be included. In the input/output circuit 11243, information communication from the communication circuit 1121, information on the rotational speed from the rotational speed detection circuit 1123, and information on the environmental temperature from the temperature sensor 1125 are input, and output information from the input/output circuit 11243 to the boost current determination circuit 1124 to the field current control circuit 1122 are output.

The arithmetic processing unit 11241 may execute the program stored in the ROM of the storage device 11242 so that the operation in FIG. 2 described later can be performed.

The generator current matrix and the generator drive torque matrix illustrated in FIGS. 4 and 5, for example, a plurality of patterns are prepared in advance for each ambient temperature range for the ambient temperature range in which the vehicle is used, and for each vehicle generator or engine speed, the power generation rate, rotation speed, output current, and drive torque in each pattern are expressed as numerical data, the data is stored in the storage device 11242 such as a RAM, and the arithmetic processing device 11241 uses the stored data, the high-efficiency generator for vehicle is controlled so that the field current is optimal for the required power generation rate corresponding to various engine capacities.

Figure 2:
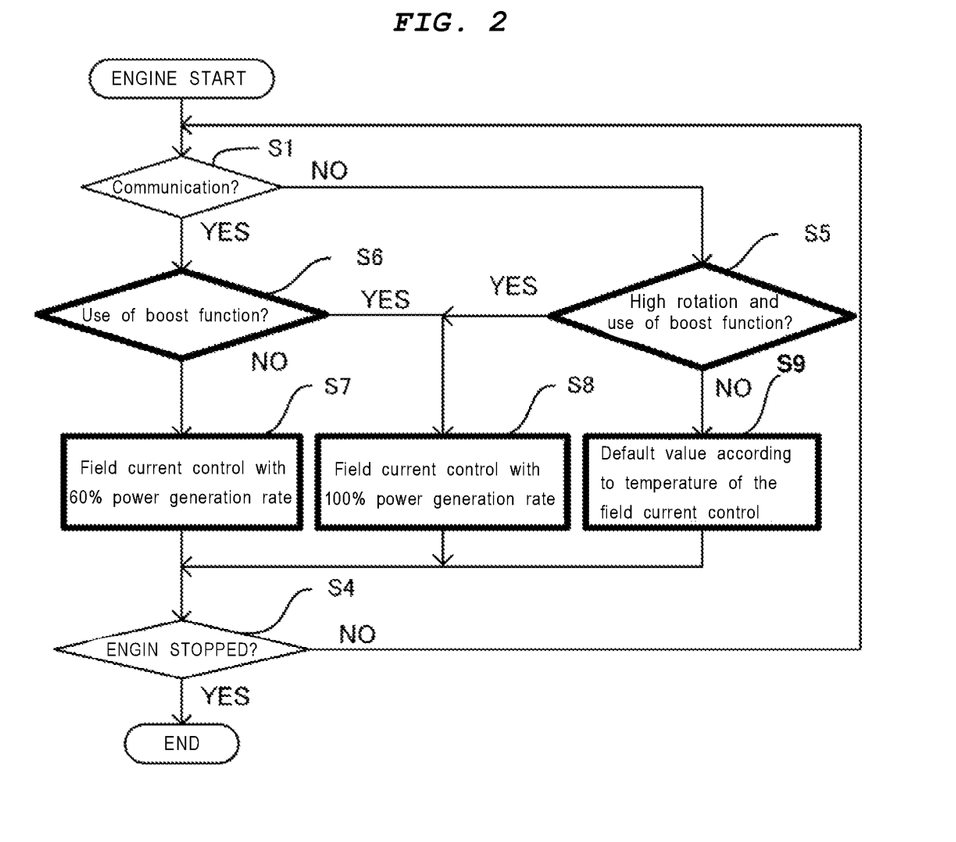
FIG. 2 is a diagram showing the first embodiment of the present application, and is a flowchart for explaining an example of the operation of the main part of the generator control system for vehicle of FIG. 1 from engine start to engine stop.

Note that the boost permission determination circuit 1124, for example, performs the operation of FIG. 2, further, the boost permission determination circuit 1124 controls the high-efficiency generator for vehicle so that the field current is optimum for the required power generation rate corresponding to various engine capacities, for example, it may be configured by IC (Integrated Circuit) and LSI (Large Scale Integration).

Figure 3:
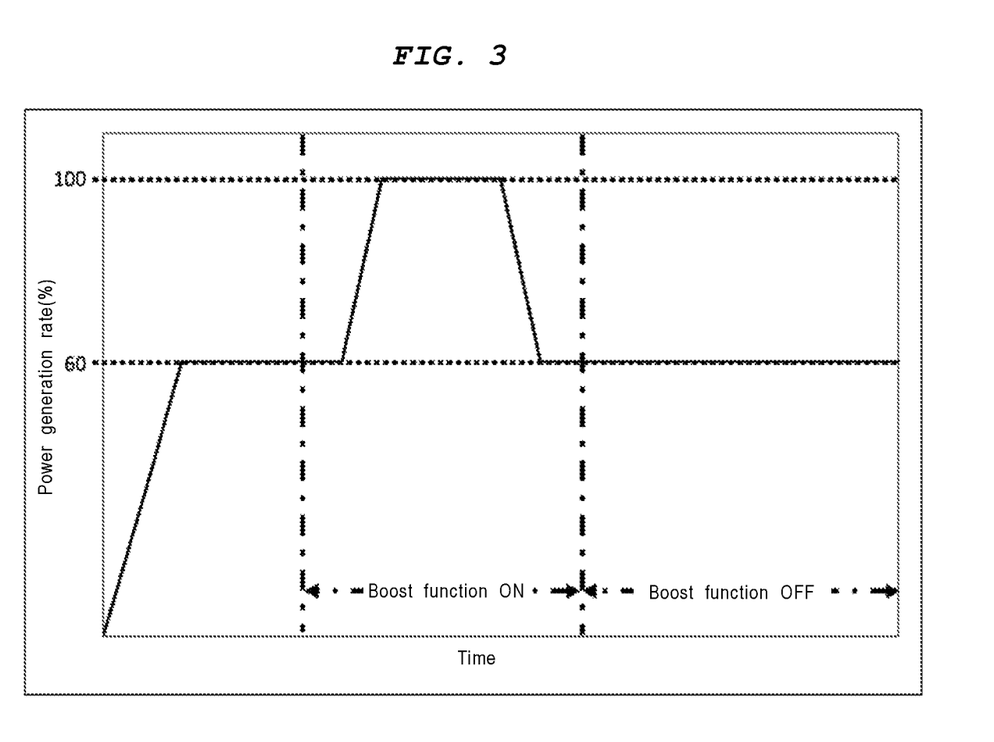
FIG. 3 is a diagram showing the first embodiment of the present application, and is a timing chart showing an example of the presence or absence of communication between the engine control device and the generator control device for vehicle in the generator control system for vehicle of FIG. 1, and the relation between boost function ON-OFF.

The operation flow of the generator control system for vehicle from the engine start to the engine stop is shown in FIG. 2, and the timing chart when there is communication between the engine control device and the generator control device for vehicle is shown in FIG. 3.

The operation of the generator control system for vehicle will be described below with reference to FIG. 2.

After the engine is started, the communication circuit 1121 determines whether or not there is communication between the engine control device 12 and the generator control device for vehicle 112 (step S1), when there is communication between the engine control device 12 and the generator control device for vehicle 112, the engine control device 12 performs power generation control of the generator control device for vehicle 112. At this time, the engine controller 12 issues a boost function use instruction (step S6), the field current control (step S8) with 100% power generation rate of highly efficient generator for vehicle, or a field current control is performed at a power generation rate that does not affect the engine system, which may have a small power generation rate, for example, a power generation rate of 60% (step S7).

For example, when a generator for vehicle capable of handling a 2000 cc large capacity engine is for example applied to a vehicle having a 2000 cc large capacity engine, to a 1000 cc medium capacity engine vehicle, or to a vehicle with a 500 cc small capacity engine, the appropriate power generation rate of the generator for vehicle will be exemplified below. For vehicles with a 2000 cc large capacity engine, for example, the field current control for generating power at a power generation rate of 100% is performed, for a 1000 cc medium capacity engine, for example, the field current control is performed to generate power at a power generation rate of 70%, for a 500 cc small capacity engine, for example, the field current control for generating power at a power generation rate of 50% is performed.

In other words, when the first power generation rate, for example 70%, is specified by the communication information from the engine control device 12 to the generator control device for vehicle 112, the field current control is performed by the boost permission determination circuit so as to be the first power generation rate, when a second power generation rate different from the first power generation rate, for example 50%, is specified by the communication information, the field current control is performed by the boost permission determination circuit so as to be the second power generation rate, when a generator for vehicle with a large current capacity is applied to an engine system that may have a small power generation rate, the torque generated by the generator for vehicle should not be greater than the torque allowed by the engine, field current control is performed by the boost permission determination circuit.

The above-described power generation rate refers to the required power generation rate corresponding to the engine capacity, for example, the required power rate for a 2000 cc large capacity engine is defined as 130 A, the required power rate for a 1000 cc medium capacity engine is 95 A, and the required power rate for a 500 cc small capacity engine is defined as 50 A.

The high efficiency in the above-described highly efficient generator for vehicle refers to a generator for vehicle applicable from a large capacity engine system to a small capacity engine system.

Due to a lack of communication between the engine control device 12 and the generator control device for vehicle 112, when the control device 112 of the generator for vehicle cannot be controlled from the engine control device 12 side, for example, when there is no communication from the engine control device 12 side to the generator control device for vehicle 112 (step S1), the use of the boost function is determined according to the engine speed (step S5). This boost function is allowed at high revolutions when the torque is low. When the use of the high speed and boost function is permitted, the field current control (step S8) is performed at a power generation rate of 100%. On the other hand, when not using the boost function, an appropriate default value is set based on the correlation between the environmental temperature detected by the temperature sensor 1125, the field current and the torque, and the field current control is performed (step S9). The above operation flow is repeated until the engine stops (step S4).

When the rotation speed is low (for example, 1000 rpm), when generating at a power generation rate that does not affect the engine system (for example, 60%), when the field current is smaller than when power is generated at a power generation rate of 100% for a conventional generator for vehicle, by using load response control, it is possible to generate power while adjusting the output current.

In other words, in the above-described first embodiment, in the generator control system for vehicle disclosed in the present application, the generator control system for vehicle in which the generator control device for vehicle performs different field current control when there is communication between the engine control device and the generator control device for vehicle and when there is no communication, the boost permission determination circuit capable of controlling the power generation rate is provided in the control device for the generator for vehicle, when there is communication between the engine control device and the generator control device for vehicle, the field current control is performed by the boost permission determination circuit so as to achieve a specified power generation rate by the communication, when there is no communication between the engine control device and the generator control device for vehicle, the field current control is performed by the boost permission determination circuit based on the rotation speed and temperature of the generator for vehicle, when the generator for vehicle is applied to an engine system whose power generation rate may be smaller than the current capacity of the generator for vehicle, the field current control is performed by the boost permission determination circuit so that the torque generated by the generator for vehicle does not become larger than the torque allowed by the engine, it is possible to say that it is a generator control system for vehicle.

Further, it is possible to say that the generator control system for vehicle disclosed in the present application is a generator control system for vehicle wherein the generator control device for vehicle performs different field current control depending on communication information between the engine control device and the generator control device for vehicle, the boost permission determination circuit capable of controlling the power generation rate is provided in the control device for the generator for vehicle, when the first power generation rate is designated by the communication information, the field current control is performed by the boost permission determination circuit so as to be the first power generation rate, when the second power generation rate different from the first power generation rate is designated by the communication information, the field current control is performed by the boost permission determination circuit so as to be the second power generation rate, when the generator for vehicle with a large current capacity is applied to an engine system that may have a small power generation rate, field current control is performed by the boost permission determination circuit so that the torque generated by the generator for vehicle does not exceed the torque allowed by the engine.

The above-described first embodiment has the following technical characteristics from a different viewpoint.

Characteristic point 1: It is a generator control device for vehicle wherein the generated voltage is adjusted to a predetermined voltage by intermittently controlling the field current at a constant cycle, in a rotational speed detection circuit that measures a rotational speed of a control signal and a generator for vehicle from an engine control device and detects the rotational speed, or a control device for a generator for vehicle that performs variable control of an adjustment voltage by the rotational speed detection circuit, the field current is intermittently controlled, from the control signal from the engine control device and the rotational speed of the generator for vehicle, when there is no control signal from the engine control device and the means for intermittently controlling the field current, the rotational speed of the vehicle generator is detected, intermittent control of field current by means of setting appropriate default value based on correlation between temperature and torque.

Characteristic point 2: In the characteristic point 1, the generator control device for vehicle provides a logic circuit that controls the power generation rate so that it does not affect the engine system that has a small power generation rate, according to a generator for vehicle with a large current capacity, a logic circuit that controls the power generation rate so that it does not affect the engine system that has a small power generation rate, a free-wheeling diode connected in parallel to the field coil of the generator for vehicle, a switching element controlled by a gate drive signal from a field current control circuit, a field current control circuit for generating a signal for driving the switching element, and a boost permission determination circuit.

Characteristic point 3: In the characteristic point 1, the power generation control for vehicle is usually a generator control device for vehicle that is converted into torque information from an input signal from the engine control device and the rotation speed of the generator for vehicle, and is executed by power generation rate control.

Characteristic point 4: In the characteristic point 2, the generator control device for vehicle sets the appropriate default value from the correlation matrix of the temperature, the field current, and the torque to control power generation depending on the rotational speed of the generator for vehicle, and when communication between the control device for the generator for vehicle and the engine control device in the technical feature 1 is interrupted.

Characteristic point 5: In the characteristic point 1, the generator control device for vehicle generates the input (control) signal from the engine control device in characteristic point 3 based on the engine torque information, the temperature and the field current, and performs power generation control based on the control signal and the rotational speed of the generator for vehicle.

Characteristic point 6: A generator control device for vehicle wherein in an engine system having a small power generation rate and equipped with a generator for vehicle having a large current capability in the characteristic point 2, fuel economy can be improved by temporarily maximizing the power generation rate of the generator for vehicle under certain conditions (low temperature, etc.) with an input signal from the engine controller.

Characteristic point 7: Even when a generator for vehicle with a large current capability is applied to an engine system that may have a small power generation rate, the maximum torque is the power generation rate, the field current can be controlled so that the maximum torque does not become larger than that of a generator for vehicle having a small power generation rate, the rated power can be maintained.

By controlling the maximum torque of a generator for vehicle with a large current capability, it can be used properly according to various current capabilities and can have other uses to various engine systems. Usually, the field current is controlled with the power generation rate suppressed, and the fuel efficiency can be improved by maximizing the power generation rate only under limited conditions. Since the output current capability is improved, copper loss can be improved compared to a generator for a vehicle with a small power generation rate.

In the drawings, the same reference numerals indicate the same or corresponding parts.

Further, in this application, various exemplary embodiments and examples are described, but the various features, aspects and functions described in one or more embodiments are not limited to the application of a particular embodiment, and the present invention can be applied to the embodiments alone or in various combinations.

Accordingly, innumerable modifications not illustrated are envisaged within the scope of the technology disclosed in the present application. For example, when deforming at least one component, when adding or omitting, further, extracting at least one component, the case where it combines with the component of other embodiment shall be included.

REFERENCE SIGNS LIST

1 Generator control system for vehicle,
11 Generator for vehicle,
12 Engine control device,
13 Battery,
111 Generator part,
1111 Field coil,
1112 Stator coil,
1113 Three-phase AC rectifier,
112 Generator control device for vehicle,
1121 Communication circuit,
1122 Field current control circuit,
1123 Rotation speed detection circuit,
1124 Boost permission determination circuit,
11241 Arithmetic processing device,
11242 Storage device,
11243 Input/output circuit,
11244 Bus,
1125 Temperature sensor,
1126 Switching element,
1127 Return diode.

The invention claimed is:

1. A generator control system for vehicle, wherein
a generator control device for vehicle performs different field current control when there is communication between the engine control device and the generator control device for vehicle and when there is no communication,
a boost permission determination circuit controlling the power generation rate by controlling the field current is provided in the generator control device for vehicle, and when there is communication between the engine control device and the generator control device for vehicle, the field current control is performed by the boost permission determination circuit so as to limit the power generation rate to a power generation rate less than a maximum power generation rating so that the power generation rate does not increase to or more than a specified power generation rate by a power generation rate restriction instruction from the communication, a field current control is performed by the boost permission determination circuit based on the rotation speed and temperature of a generator for vehicle so that the limitation of the power generation rate is released and the power generation rate becomes a power generation rate larger than the limited power generation rate by a power generation rate restriction instruction from the communication when there is no communication between the engine control device and the generator control device for vehicle, the field current control is performed by the boost permission determination circuit so that the torque generated by the generator for vehicle does not become larger than the torque allowed by the engine when the generator for vehicle is applied to an engine system whose power generation rate is smaller than the current capacity of the generator for vehicle.

2. The generator control system for vehicle according to claim 1, wherein
when there is no communication between the engine control device and the generator control device and the rotation speed of the generator does not meet the boost function use condition, the field current control is performed using a default value that is adjusted based on temperature in the boost permission determination circuit.

3. AThe generator control system for vehicle according to claim 1, wherein
when a first power generation rate less than the maximum power generation rating is specified by the communication information, the field current control is performed by the boost permission determination circuit so as to be the first power generation rate,
when a second power generation rate different from the first power generation rate and less than the maximum power generation rating is specified by the communication information, the field current control is performed by the boost permission determination circuit so as to be the second power generation rate.

4. The generator control system for vehicle according to claim 1, wherein
the boost permission determination circuit is composed of an arithmetic processing device, a storage device, and an input/output circuit connected by a bus, respectively,
based on a communication information received by the input/output circuit from the engine control device, a program stored in the storage device is executed, and the field current control is performed by the arithmetic processing device.

5. The generator control system for vehicle according to claim 2, wherein
the boost permission determination circuit is composed of an arithmetic processing device, a storage device, and an input/output circuit connected by a bus, respectively,
based on a communication information received by the input/output circuit from the engine control device, a program stored in the storage device is executed, and the field current control is performed by the arithmetic processing device.

6. The generator control system for vehicle according to claim 3, wherein
the boost permission determination circuit is composed of an arithmetic processing device, a storage device, and an input/output circuit connected by a bus, respectively,
based on the communication information received by the input/output circuit from the engine control device, a program stored in the storage device is executed, and the field current control is performed by the arithmetic processing device.

7. A generator control system for vehicle, wherein
a generator control device for vehicle performs different field current control when there is communication between the engine control device and the generator control device for vehicle and when there is no communication,
a boost permission determination circuit capable of controlling the power generation rate is provided in the generator control device for vehicle, and when there is communication between the engine control device and the generator control device for vehicle, the field current control is performed by the boost permission determination circuit so as to achieve a specified power generation rate by the communication,
a field current control is performed by the boost permission determination circuit based on the rotation speed and temperature of a generator for vehicle when there is no communication between the engine control device and the generator control device for vehicle,
the field current control is performed by the boost permission determination circuit so that the torque generated by the generator for vehicle does not become larger than the torque allowed by the engine when the generator for vehicle is applied to an engine system whose power generation rate is smaller than the current capacity of the generator for vehicle,
when there is communication between the engine control device and the generator control device and the generator control device receives a boost function use instruction from the engine control device, or when there is no communication between the engine control device and the generator control device and the rotation speed of the generator meets a boost function use condition, the generator control device performs the field current control with a preset maximum power generation rate, and
when there is communication between the engine control device and the generator control device, but the engine control device does not issue the boost function use instruction, the generator control device performs the field current control with a preset reduced power generation rate that is less than the preset maximum power generation rate.

\* \* \* \* \*